United States Patent
Lortz et al.

(10) Patent No.: US 9,471,697 B2
(45) Date of Patent: Oct. 18, 2016

(54) URI-BASED HOST TO MOBILE DEVICE SETUP AND PAIRING

(71) Applicants: Victor B. Lortz, Beaverton, OR (US); Somya Rathi, Portland, OR (US)

(72) Inventors: Victor B. Lortz, Beaverton, OR (US); Somya Rathi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 218 days.

(21) Appl. No.: 13/727,870

(22) Filed: Dec. 27, 2012

(65) Prior Publication Data

US 2014/0187149 A1 Jul. 3, 2014

(51) Int. Cl.
*G06F 17/30* (2006.01)
*H04W 4/00* (2009.01)
*H04L 29/08* (2006.01)

(52) U.S. Cl.
CPC ........ *G06F 17/30879* (2013.01); *H04W 4/008* (2013.01); *H04L 67/02* (2013.01)

(58) Field of Classification Search
CPC combination set(s) only.
See application file for complete search history.

(56) References Cited

U.S. PATENT DOCUMENTS

2009/0294539 A1* 12/2009 Kim .................. 235/462.01
2010/0241857 A1* 9/2010 Okude et al. ................. 713/168
2011/0307318 A1* 12/2011 LaPorte et al. ............. 705/14.33
2012/0008161 A1 1/2012 Rouhana
2012/0252420 A1* 10/2012 Czaja et al. ............... 455/414.1
2012/0254768 A1 10/2012 Aggarwal
2013/0173358 A1* 7/2013 Pinkus ........................ 705/14.1
2013/0309977 A1* 11/2013 Heines ..................... G06F 8/70
455/67.7

FOREIGN PATENT DOCUMENTS

KR 101083985 B1 11/2011
KR 10-2012-0092366 A 8/2012
WO 2012/135563 A1 10/2012
WO 2012/151290 A1 11/2012

OTHER PUBLICATIONS

International Search Report and Written Opinion received for Patent Application No. PCT/US2013/048219, mailed on Oct. 31, 2013, 11 pages.
Korean Office Action recieved for Patent Application No. 2015-7013793, mailed on Jan. 12, 2016, 4 pages.
English Translation of Korean Office Action mailed Jan. 12, 2016, 4 pages.
Extended European Search Report from Application No. 13868691.0 mailed Aug. 4, 2016. (9 pgs.).

* cited by examiner

*Primary Examiner* — Junpeng Chen
(74) *Attorney, Agent, or Firm* — Sutherland Asbill & Brennan LLP

(57) ABSTRACT

Systems and methods directed to URI-based host to mobile device setup and pairing are described herein. A uniform resource identifier (URI) may be received from a host device. A request for an application associated with the host device and the wireless device may be transmitted based at least in part on the URI. The requested application may be received. An association with the host device may be established based at least in part on the application.

21 Claims, 5 Drawing Sheets

URI-BASED HOST TO MOBILE DEVICE SETUP AND PAIRING

TECHNICAL FIELD

Embodiments of this disclosure relate generally to electronic devices, and more particularly, to uniform resource identifier (URI)-based host to mobile device setup and pairing.

BACKGROUND

Wireless devices, such as smartphones or tablets, may establish a connection with other electronic devices or vehicles. However, establishing a pairing of the wireless devices with the other device or vehicle is often a cumbersome and time-consuming process. For example, current techniques require setting up user accounts, manually entering vehicle identification numbers, or using a browser and an online portal.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Figure 1:
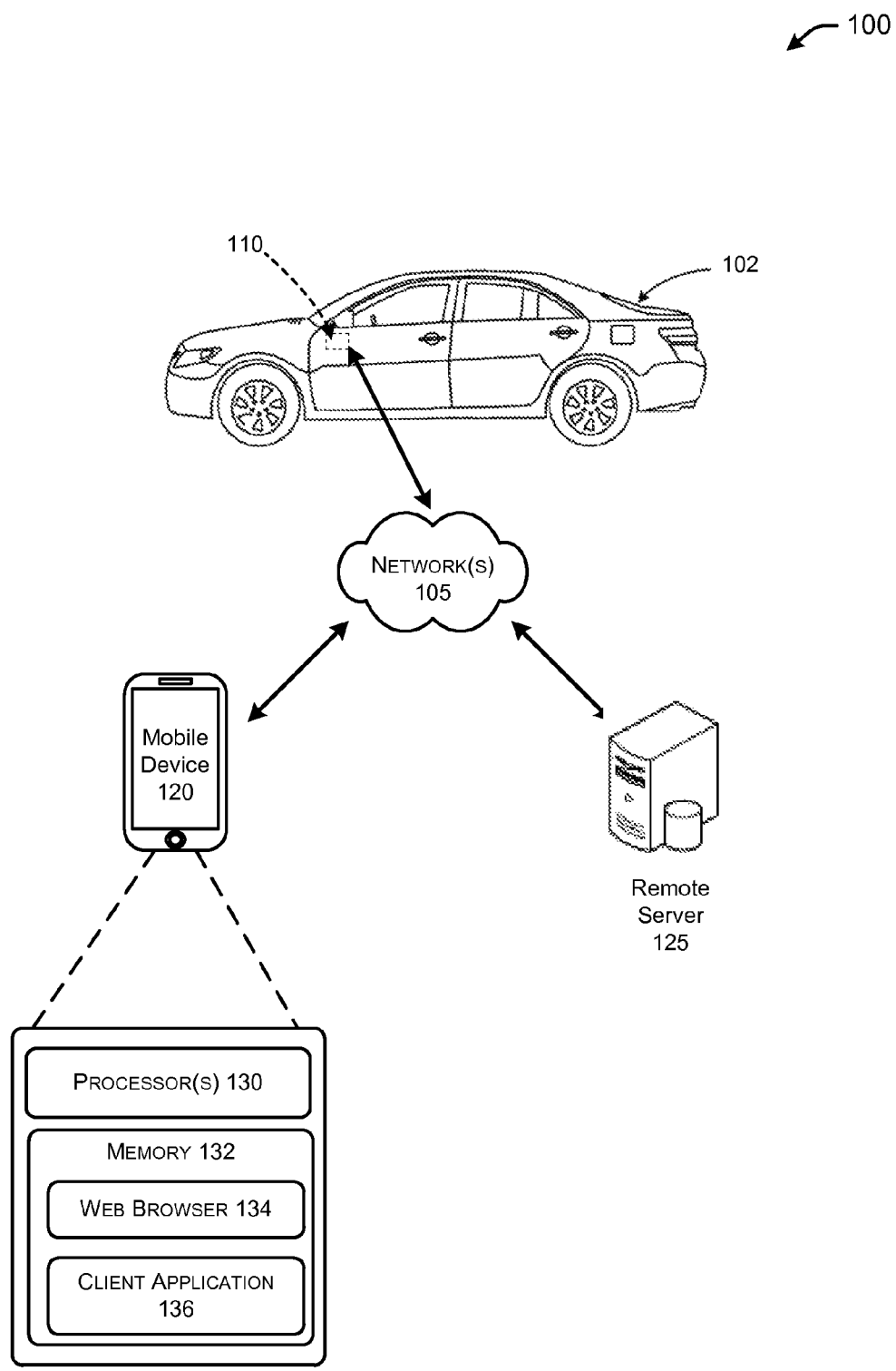
FIG. 1 is a block diagram of a configuration for URI-based host to mobile device setup and pairing, in accordance with an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Embodiments of the disclosure are described more fully hereinafter with reference to the accompanying drawings in which embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments herein may be directed to uniform resource identifier (URI)-based host to mobile device setup and pairing. The systems and methods described herein enable a mobile device, such as a smartphone or tablet, to be provisioned and paired with a host device, such as a vehicle in-vehicle infotainment (IVI) system. In some embodiments, a cloud service may be used to authorize the pairing and direct the mobile device to install the correct application and perform local wireless pairing for further communication with the host device. The host device does not need to have an Internet connection, thus enabling a lower-cost deployment of the systems and methods described herein. While various embodiments and features of the present disclosure are described in the context of pairing a mobile device with an IVI system of a vehicle, it will be appreciated that the solutions described herein may be applied equally to other host devices, which may include, but are not limited to, electronic devices with Bluetooth capabilities, near field communication (NFC) capabilities, or the like. Examples of such electronic devices may include speakers, televisions, and the like.

In some embodiments, the systems and methods described herein may utilize the IVI system display or an NFC interface to simplify and secure the setup and pairing of the mobile device to the host device. In other embodiments, a printed URI in the form of a QR code or an NFC tag containing a URI may be used. The mobile device type may be detected automatically, and the mobile device may be directed to the correct application store based on at least in part the application installation URI. In some embodiments, the systems and methods for URI-based host to mobile device setup and pairing may pair local wireless radio links between the mobile device and the vehicle.

The installation URI may be defined to identify the correct application to install. For example, a scan of the URI may direct the mobile device to the correct application store to download the application for device setup and pairing. The installed application permits the system to securely pair other wireless links and establish mutual application-level trust with the vehicle.

FIG. 1 illustrates a block diagram of an example system configuration 100 for URI-based host to mobile device setup and pairing, in accordance with an embodiment of the disclosure. The configuration may include, but is not limited to, one or more vehicles 102. The vehicle 102 may include one or more systems that include one or more processing devices for implementing functions and features associated with the vehicle 102, as will be discussed in greater detail below.

The vehicle 102 may include a vehicle on-board platform, such as an in-vehicle infotainment (IVI) system 110. As used herein, an IVI system 110 may refer to a system in a vehicle that provides entertainment and informational features for the vehicle 102. The IVI system 110 may be part of the vehicle's main computer or a stand-alone system. The IVI system 110 may communicate with a system for URI-based host to mobile device setup and pairing, as described herein. The IVI system 110 may further include one or more processors communicatively coupled to an electronic memory, described in greater detail below.

The vehicle 102 may establish a connection with a remote server 125 over multiple types of networks 105, such as a wireless fidelity (Wi-Fi) network, a Wi-Fi Direct network, Bluetooth®, a radio network, a cellular network (e.g., third generation or fourth generation), a satellite network, a cable network, a landline-based network, the Internet, intranets, a telephone network, a television network, data networks, or other communication mediums connecting multiple computing devices to one another, as non-limiting examples. According to certain embodiments herein, multiple networks may be leveraged by the vehicle 102 to enable communication with the remote server 125.

The IVI system 110 may be configured to be coupled to a mobile device 120. The mobile device 120 may include one or more electronic device processors communicatively coupled to an electronic device memory, as well as a user interface and an output element, such as a speaker of the vehicle 102. The mobile device 120 may communicate with the vehicle 102 via a communicative link. In certain embodiments herein, devices related to the implementation of in-vehicle context formation may exist onboard an WI system 110 such that the functionality described herein may be associated with the IVI system 110. In other embodiments, the functionality described herein may reside independently of other systems or may be associated with various other systems.

The IVI system 110 may be in communication with one or more mobile devices 120. In one aspect, a mobile device 120 may serve as an extension of the IVI system 110. For example, if the IVI system 110 does not have Internet capabilities, the WI system 110 may communicate with a mobile device 120 associated with the vehicle 102 to utilize the communication capabilities of the mobile device 102.

The communicative link may be any suitable electronic communication link including, but not limited to, a hardwired connection, a serial link, a parallel link, a wireless link, a Bluetooth® channel, a ZigBee® connection, a wireless fidelity (Wi-Fi) connection, a near field communication (NFC) protocol, a proprietary protocol connection, or combinations thereof. In one aspect, the communicative link may be secure such that it is relatively difficult to intercept and decipher communications between the mobile device 120 and the IVI system 110. In certain embodiments, the communicative link may be encrypted. Further, in certain embodiments, the communications may be encrypted at more than one open systems interconnection (OSI) model layer. For example, the communications between the mobile device 120 and the vehicle 102 may be encrypted at both the application layer and the transport layer. In some embodiments, the communicative link may be through the communication capabilities of a mobile device 120 associated with the vehicle 102. For example, if the vehicle 102 does not have Internet capabilities, the IVI system 110 may be able to access data through its association with, for example, a smartphone with cellular communication capabilities.

In some embodiments, pairing the IVI system 110 and the mobile device 120 may include establishing a connection between the IVI system 110 and the mobile device 120 and authenticating or authorizing the mobile device 120. Once authenticated, the mobile device 120 may be considered a trusted source of data for the IVI system 110. In some embodiments, the IVI system 110 may be considered a trusted source of data for the mobile device 120.

For the purposes of this discussion, the vehicle 102 may include, but is not limited to, a car, a truck, a light-duty truck, a heavy-duty truck, a pickup truck, a minivan, a crossover vehicle, a van, a commercial vehicle, a private vehicle, a sports utility vehicle, a tractor-trailer, an aircraft, an airplane, a jet, a helicopter, a space vehicle, a watercraft, a motorcycle, or any other suitable vehicle with information and media capability. However, it will be appreciated that embodiments of the disclosure may also be utilized in other transportation or non-transportation related applications where electronically securing one device to another device may be implemented.

For the purposes of this discussion, the mobile device 120 may include, but is not limited to, a tablet computer, a notebook computer, a netbook computer, a personal digital assistant (PDA), a cellular telephone, a smartphone, a digital reader, or any other suitable electronic device with communicative, processing, and storage capabilities.

Still referring to FIG. 1, the mobile device 120 may include at least one memory 132 and one or more processing units (or processor(s)) 130. The processor(s) 130 may be implemented as appropriate in hardware, software, firmware, or combinations thereof. Software or firmware implementations of the processor(s) 130 may include computer-executable or machine-executable instructions written in any suitable programming language to perform the desired functions. Similarly, hardware implementations of the processor(s) 130 may be configured to execute computer-executable or machine-executable instructions to perform the various functions described.

The memory 132 may store program instructions that are loadable and executable on the processor(s) 130, as well as data generated during the execution of these programs. Depending on the configuration and type of mobile device 120, the memory 132 may be volatile (such as random access memory (RAM)) and/or non-volatile (such as read-only memory (ROM), flash memory, etc.). The mobile device 120 may also include additional removable storage and/or non-removable storage (not shown) including, but not limited to, magnetic storage, optical disks, and/or tape storage. The disk drives and their associated computer-readable media may provide non-volatile storage of computer-readable instructions, data structures, program modules, and other data. In some implementations, the memory 132 may include multiple different types of memory, such as static random access memory (SRAM), dynamic random access memory (DRAM), and/or ROM.

The memory 132 and/or the additional storage (not shown), removable and/or non-removable, are all examples of computer-readable storage media. For example, computer-readable storage media may include volatile and/or non-volatile, removable and/or non-removable media implemented according to any method or technology for storage of information such as computer-readable instructions, data structures, program modules, and/or other data. Further, the mobile device 120 may further include additional components that are not depicted such as, for example, communications connection(s), input/output (I/O) devices, and so forth.

A web browser 134 may be loaded into the memory 132. The web browser 134 may be invoked by one or more client applications 136 or may be used to open or navigate to a URI over one or more networks 105.

One or more client applications 136 may be loaded into the memory 132. The client application 136 may be any application capable of facilitating setup and pairing between the mobile device 120 and the host device (e.g., vehicle 102).

Figure 2:
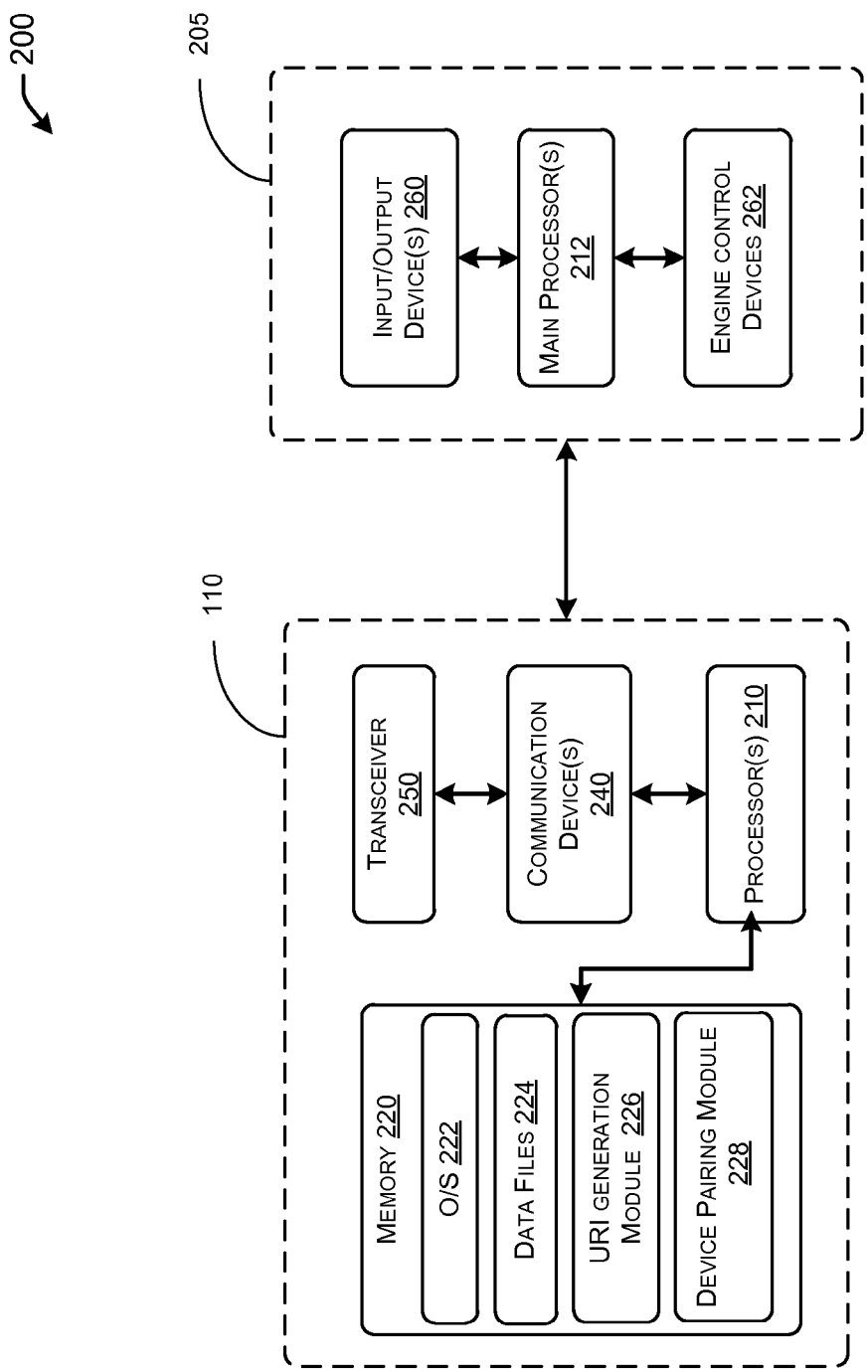
FIG. 2 is a block diagram of a URI-based host to mobile device setup and pairing system, in accordance with an embodiment of the disclosure.

FIG. 2 depicts a block diagram of an example vehicle computing system 200 in a vehicle, e.g., vehicle 102 in FIG. 1, for implementing URI-based host to mobile device setup and pairing, among other things. As shown in FIG. 2, multiple vehicle systems may exist. For example, a computing system 205 may exist for controlling a vehicle's standard devices or components, which may include engine devices, braking devices, power steering devices, door control devices, window control devices, etc., in one embodiment. The computing system 205 may also include various input/output (I/O) devices 260 that may exist in a vehicle, such as image sensors or collection devices (e.g., a microphone, a seat weight sensor, cameras, both interior-facing cameras for capturing images within a vehicle and exterior-facing cameras for capturing images from a vehicle's surroundings), and display devices, such as light-emitting diode (LED) displays and organic light-emitting diode (OLED) displays, as non-limiting examples. A main processor 212 may communicate with the standard engine control devices 262 and I/O devices 260 to activate the devices, send information to these devices, or collect information from these devices, as non-limiting examples.

The computing system 205 may be in communication with the WI system 110. As used herein, an IVI system may refer to a system in a vehicle that provides entertainment and informational features for the vehicle.

The IVI system 110 may include, but is not limited to, a processor 210, a memory 220, one or more communication devices 240, and a transceiver 250. The processor 210 may communicate with the communication devices 240 in the IVI system 110. For example, the processor 210 may communicate with the memory 220 to execute certain computer-executable instructions or modules, such as 226, 228, stored in the memory 220 to facilitate the URI-based host to mobile device setup and pairing as described herein. In one embodiment, the processor 210 may also communicate with the one or more communication devices 240 to send and receive messages from various types of networks 105, such as those listed above. A transceiver 250 may facilitate sending and receiving such messages. In some embodiments, a transmitter and a separate receiver may be utilized to send and receive messages, respectively.

In certain embodiments, the processor 210 of the IVI system 110 may also communicate with the main processor 212 and/or other devices of the computing system 205 in response to executing computer-executable instructions in the device pairing module 228 to generate or process context information.

The processors 210 and 212 may include any number of suitable processing devices, such as a central processing unit (CPU), a digital signal processor (DSP), a reduced instruction set computer (RISC), a complex instruction set computer (CISC), a microprocessor, a microcontroller, a field programmable gate array (FPGA), or any combination thereof. In one embodiment, the vehicle computing system 200 may be based on an Intel® Architecture system, and the processors 210 and chipset may be from a family of Intel® processors and chipsets, such as the Intel® Atom® processor family. The processor 210 may also include one or more processors as part of one or more application-specific integrated circuits (ASICs) or application-specific standard products (ASSPs) for handling specific data processing functions or tasks. Additionally, any number of suitable I/O interfaces and/or communications interfaces (e.g., network interfaces, data bus interfaces, etc.) may facilitate communication between the processors 210 and other components of the vehicle computing system 200.

The one or more communication devices 240 may facilitate communications between the vehicle computing system 200 and other devices that may be external to a vehicle 102 containing the system 200. For example, the one or more communications devices 240 may enable the vehicle computing system 200 to receive messages from a mobile device 120 and/or send messages to a mobile device 120 as illustrated in FIG. 1. The communication devices 240 may enable various types of communications over different networks 105, such as wireless networks including, but not limited to, a wireless fidelity (Wi-Fi) network, an NFC connection, a radio network, a cellular network, a GPS network, a ZigBee® connection, a Bluetooth® channel, proprietary protocol connections, and other wireless links, as well as hardwired connections, serial link connections, parallel link connections, or combinations thereof.

According to various configurations, one or multiple interface cards or circuits may support the multiple networks named above. In one embodiment, such one or more interface cards or circuits may be onboard such that firmware in the memory 220 may access and control communications associated with the customized IVI system 110.

Turning now to the contents of the memory 220, the memory 220 may include any number of suitable memory devices, such as caches, read-only memory devices, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, magnetic storage devices, removable storage devices (e.g., memory cards, etc.), and/or non-removable storage devices. As desired, the memory 220 may include internal memory devices and/or external memory devices in communication with the vehicle computing system 200.

The memory 220 may store data, executable instructions, and/or various program modules utilized by the processor 210. Examples of data that may be stored by the memory 220 include data files 224 and any number of suitable program modules and/or applications that may be executed by the processor 210, such as, but not limited to, an operating system (O/S) 222, a URI generation module 226, and a device pairing module 228. Each of these modules may be implemented as individual modules or, alternatively, one or more of the modules may perform all or at least some of the functionality associated with the other modules. In certain embodiments, these modules may be stored as firmware in a read-only memory 220, thereby making it more difficult for the functions described herein to be tampered with or disabled.

The data files 224 may include any suitable information that may facilitate URI-based host to mobile device setup and pairing. Example information may include, but is not limited to, information that may be used to associate a mobile device 120 with the IVI system 110, information associated with requests from mobile devices 120 and responses to such requests, as well as other information that may facilitate the processes described herein.

The O/S 222 may include a suitable module or application that facilitates general operation of the vehicle computing system 200, as well as the execution of other program modules illustrated in the memory 220 in FIG. 2.

The URI generation module 226 may perform a number of functions to facilitate the generation of codes, including a URI, to a remote server 125. The URI generation module 226 may generate a URI that may point to a remote server 125. The URI may include an identification number for the host device, such as a serial number or vehicle identification number (VIN). In some embodiments, the URI may include an authorization code. The authentication code may be generated using a secure hash, such as HMAC-SHA256, using a strong pre-shared secret. To avoid creating an overly long URI that would result in a very large quick response (QR) code, the authentication code may be a truncated hash. An example would be 16 characters representing 12 octets encoded in base-64. The values hashed into the authentication code may include data such as the VIN, a monotonically increasing counter, and a role designation (such as "G" for guest or "O" for owner of the phone). The remote server 125 may save the last-used counter value or a set of all previously used counters for each vehicle using the VIN as an index. When a mobile device 120 presents the URI with an authentication code, the remote server 125 may check the counter value to make sure it has not already been used. If the counter has not been used, then the remote server 125 can confirm the authentication code using its knowledge of that vehicle's pre-shared secret.

The URI generated by the URI generation module 226 may include additional information, such as a version identifier for a client application 136, a counter, or the like.

Once the URI is generated, it may display as a QR code on the IVI system 110. In some embodiments, URI generation module 226 may also present the URI as an NFC code.

The device pairing module 228 may perform a number of functions to facilitate the URI-based host to mobile device setup and pairing. For example, the device pairing module 228 may communicate with the client application 136 of a mobile device 120 to transmit and receive data necessary to establish a connection between the mobile device 120 and the host device (e.g., vehicle 102).

In addition to or as an alternative to the memory 220, other embodiments may include one or more suitable computer-readable media that may be provided for storing computer-executable instructions such as those stored in the memory 220. One or more processing devices, such as the processor 210, may execute such computer-executable instructions to facilitate the remote management of a vehicle, as described above in association with the modules 226, 228 in the memory 220. As used herein, the term "computer-readable medium" may describe any form of suitable memory or memory device for retaining information in any form, including various kinds of storage devices (e.g., magnetic, optical, static, etc.) that are non-transitory. Indeed, various embodiments of the disclosure may be implemented in a wide variety of suitable forms.

Figure 3:
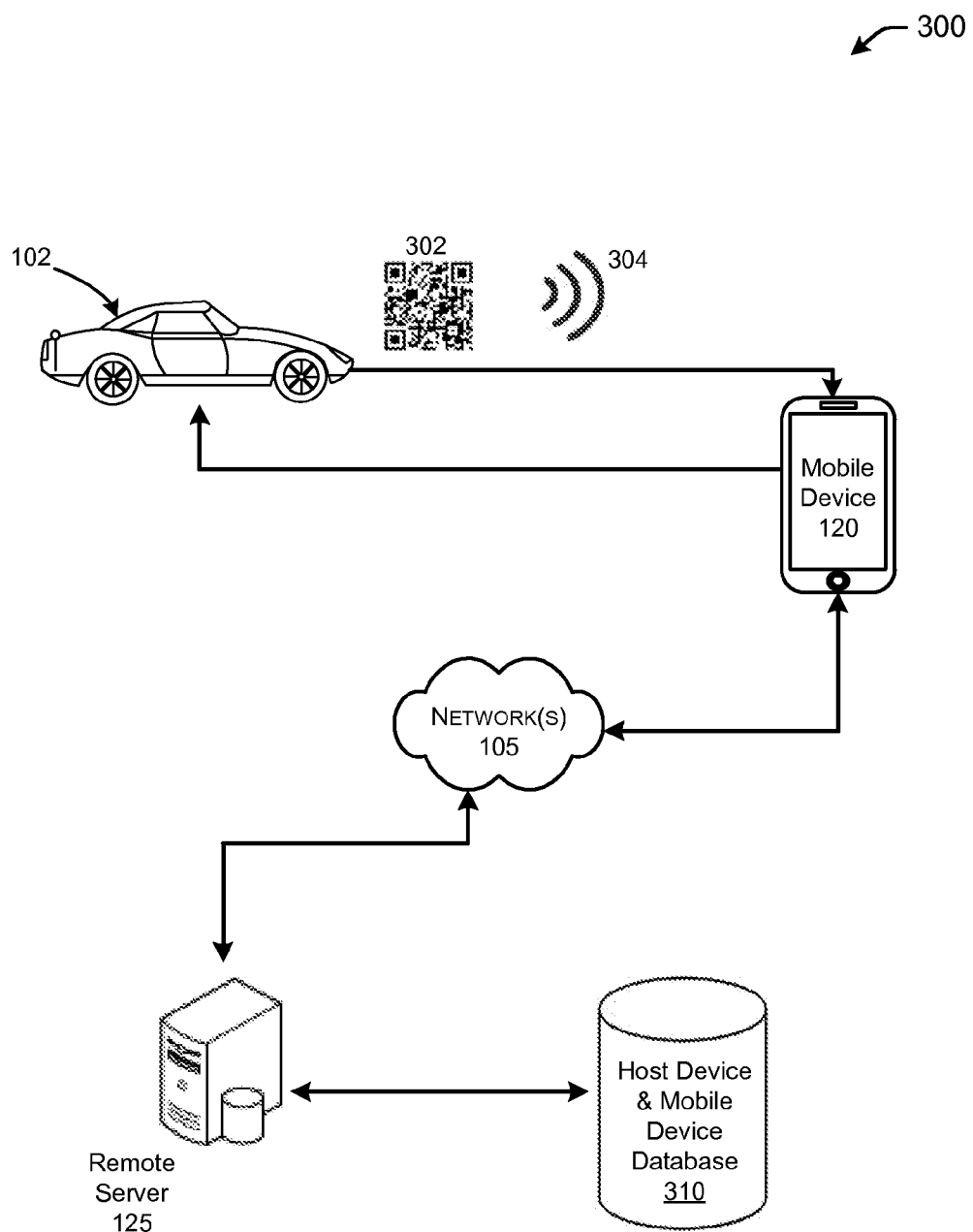
FIG. 3 is a block diagram of a configuration for URI-based host to mobile device setup and pairing, in accordance with an embodiment of the disclosure.

FIG. 3 is a block diagram of a configuration 300 for URI-based host to mobile device setup and pairing, in accordance with an embodiment of the disclosure. In brief overview, the URI generation module 226 may generate a URI, and the IVI system 110 may present the URI to one or more occupants of the vehicle 102. A mobile device 120 may scan or otherwise receive the URI. A web browser 134 of the mobile device 120 may open the setup URI or otherwise navigate to the URI over one or more networks 105. The remote server 125 may detect or identify the mobile device type. The remote server 125 may redirect the mobile device 120 to a source to download the client application 136 to the mobile device 120. The mobile device 120 may use the client application 136 to pair the mobile device 120 with the host device (e.g., vehicle 102).

In some embodiments, the mobile device 120 may have built-in URI scanning capabilities, such as NFC and/or QR code scanners. In some embodiments, the mobile device 120 may require a scanning application. The URI generation module 226 may generate a URI, and the IVI system 110 may present the URI to one or more occupants of the vehicle 102. The URI may be presented in the form of a QR code 302, an NFC code 304, a barcode, audio code, or the like.

The mobile device 120 may scan or otherwise receive the URI presented by the IVI system 110 of the vehicle 102. The mobile device 120 may pass the URI to the web browser 134. The web browser 134 may establish a secure connection over one or more networks 105 to a remote server 125. In some embodiments, the remote server 125 may be associated with a cloud service. The mobile device 120 may utilize standard web security protocols. The remote server 125 may extract, identify, or otherwise receive information from the URI. For example, the remote server 125 may receive a vehicle identification number (VIN) from the URI. The remote server 125 may also receive an authentication code from the URI. The remote server 125 may obtain browser information from the web browser 134 of the mobile device 120, which may be used to identify the type of mobile device 120. The remote server 125 may verify the authorization code. The remote server 125 may communicate with a host device and mobile device database 310 to determine, for example, if the authorization code is valid for the vehicle through a pre-shared secret or other service authorization mechanism. In some embodiments, the remote server 125 may note a counter value associated with the URI so that the URI is not reused later. In some embodiments, the remote server 125 saves specific mobile device information (which may have been obtained from the web browser 134 of the mobile device 120) in the host device and mobile device database 310.

The remote server 125 may redirect the mobile device 120 to the appropriate source (e.g., application store) to download the client application 136 for the host device (e.g., vehicle 102). For example, the remote server 125 may redirect the mobile device 120 based at least in part on information received such as a VIN or mobile device type. The mobile device 120 may download and install the client application 136.

After installation, the client application 136 may be launched. The client application 136 may attempt to obtain credentials for pairing the host device (e.g., vehicle 102) and the mobile device 120. In one embodiment, the mobile device 120 may prompt a user to rescan the setup URI using the client application 136. The second time the URI is scanned, the client application 136 may be launched (differing from the first time the URI was scanned, which launched the web browser 134). The client application 136 may use the URI and its authentication code to contact the remote server 125 and establish strong credentials to secure subsequent access to the service or vehicle over one or more networks 105. The new credentials may consist of a unique client identifier and a strong, dynamically computed shared secret or a digital certificate for remote client authentication.

In some embodiments, the client application 136 may obtain credentials by launching the web browser 134 with a page hosted by the cloud service associated with the remote server 125. The client application 136 may obtain setup data that was saved in a client-side storage (e.g., a cookie, HTML5 localStorage, or database). If previously saved setup data is detected by the web page, it passes the data to the newly installed client application 136 by redirecting the application using a custom scheme redirect. In some embodiments, if the setup URL was scanned by a setup helper application, the newly installed application may invoke a local API to retrieve that data from the helper application.

In some embodiments, the client application 136 may use information from the setup URI to obtain credentials for local wireless pairing such as Bluetooth and/or Wi-Fi. There are several alternative methods for assisting with local wireless pairing, and the version identifier in the URI may be used to indicate the method. One method may be to include the local wireless settings (e.g., SSID and WPA key) directly in the URI data or in additional data exchanged across the local out-of-band channel (e.g., using NFC connection handover). Another method may be to derive a pairing PIN from other data in the URI. For example, the client application 136 may perform a SHA256 hash of the VIN, authentication code, and string "Bluetooth"; truncate the result; and use the truncated byte array as a Bluetooth PIN or SSP code to secure the pairing operation. A similar approach may be used to convey a PIN for Wi-Fi protected setup. Another method may be to use the cloud service to provision the local wireless settings through the client-side storage or through direct download to the client application 136 based on the setup URI.

The client application 136 may pair the mobile device 120 to the host device (e.g., vehicle 102) and signal success by displaying a message to the user. Likewise, the IVI system 110 may indicate success once the mobile device 120 is paired, and may exit the setup mode, no longer displaying the URI. Once the mobile device 120 is paired to the vehicle 102, the client application 136 may exchange additional settings with the vehicle 102 at any time over the local wireless link. Authentication for these additional exchanges may also use the original authentication code to establish application-level security for any functions that need to be limited to that application and protected from other devices on the local wireless link.

Figure 4:
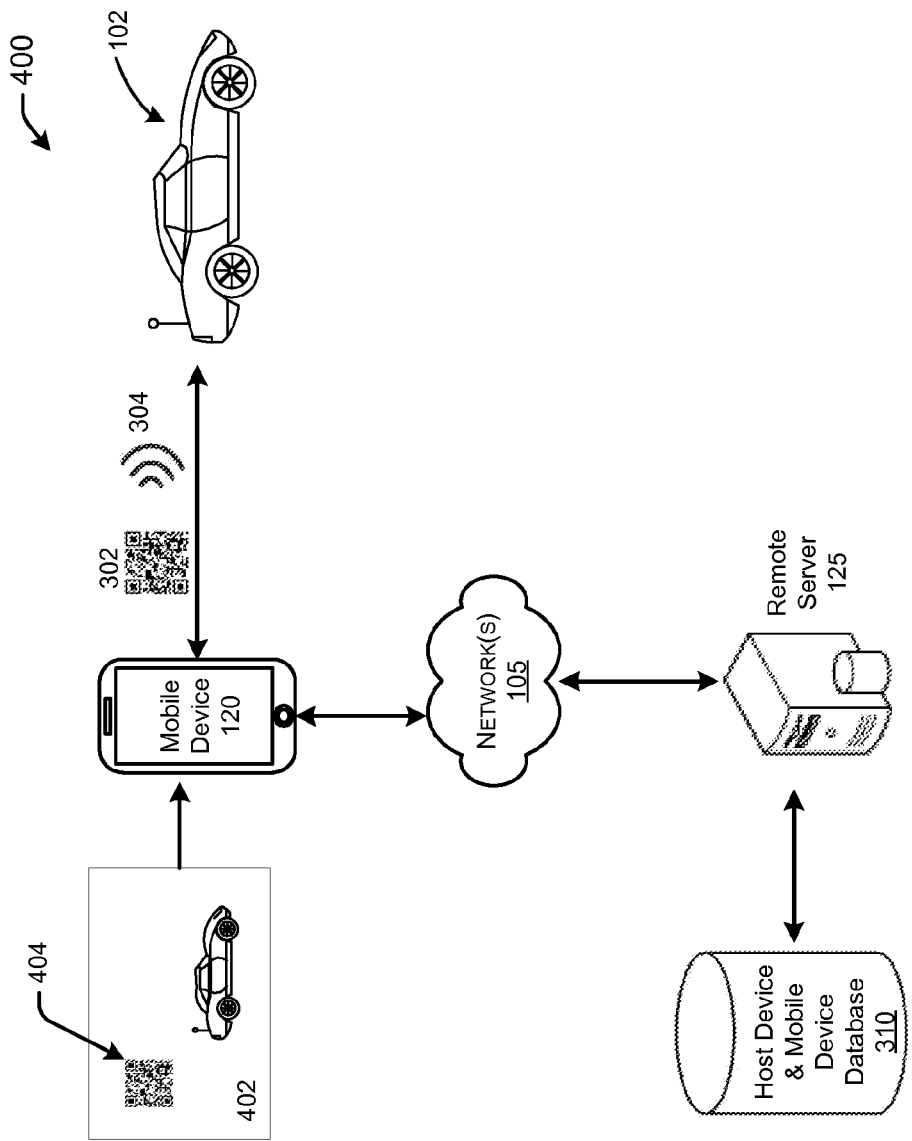
FIG. 4 is a block diagram of a configuration for URI-based host to mobile device setup and pairing, in accordance with an embodiment of the disclosure.

FIG. 4 is a block diagram of a configuration 400 for URI-based host to mobile device setup and pairing, in accordance with an embodiment of the disclosure. In brief overview, a simplified setup URI (e.g., QR code 404) may be scanned by a mobile device 120. The browser 134 of the mobile device 120 may open the URI (e.g., QR code 404). A remote server 125 may detect the type of mobile device 120 and identify the host device (e.g., vehicle 102) based at least in the part on the URI (e.g., QR code 404). The remote server 125 may redirect the mobile device 120 to the correct application store to install the correct client application 136. The URI generation module 226 may generate a setup URI (e.g., QR code 302, NFC code 304) and may present the setup URI (e.g., QR code 302, NFC code 304) to an occupant of the vehicle 102. The mobile device 120 may be used to scan the setup URI (e.g., QR code 302, NFC code 304). The client application 136 on the mobile device 120 may establish a pairing between the vehicle 102 and the client application 136 based at least in part on the setup URI (e.g., QR code 302, NFC code 304) received by the mobile device 120. This particular embodiment is directed to the scenario where a user downloads a client application 136 by scanning a simplified setup URI (e.g., QR code 404) from a source outside of the vehicle 102 (e.g., magazine, sales literature 402, etc.). When the user is in proximity to a vehicle 102 that the user wishes to pair with the mobile device 120, the user may scan a second URI (e.g., QR code 302, NFC code 304 generated by the URI generation module 226 of the vehicle 102). The client application 136 may be initiated responsive to scanning the second URI (e.g., QR code 302, NFC code 304), and the vehicle 102 and the mobile device 120 may be paired by the device pairing module 228 of the vehicle 102.

A simplified setup URI (e.g., QR code 404) may be scanned or otherwise received by a mobile device 120. In some embodiments, the simplified setup URI may be in the form of a QR code 302, an NFC code 304, a barcode, an audio code, or other form of code that may encode a URI, which may be easily scanned or received by a mobile device 120. The simplified setup URI may be present in sales literature 402, print advertisements, online advertisements, or other readily available mediums to a user. In some embodiments, the URI (e.g., QR code 404) may omit the authentication code (as discussed in relation to FIG. 3). The URI may include a host device model identifier (e.g., vehicle model identifier) or a host device identification or serial number (e.g., VIN). If the VIN is used in the URI, the remote server 125 may infer the model and year of the vehicle from the VIN. If, for example, a vehicle model identifier is used, the specific vehicle may not be identified, but enough information may be passed in the URI variable for the remote server 125 to infer the correct client application 136 and direct the mobile device 120 to the correct application store to install it. In this embodiment, there is no information to pair the mobile device 120 with the vehicle 102. However, the installed client application 136 may facilitate pairing the mobile device 120 and the host device (e.g., vehicle 102).

In some embodiments, the URI may omit the model information for the host device (e.g., vehicle 102) and contain only the URI of the remote server 125 or cloud service. There may not be enough information for the remote server 125 to identify the correct client application 136. Therefore, the remote server 125 may direct the mobile device 120 to a web page containing a list of host device models (e.g., vehicle models) and ask the user to choose the model. Once the host device model is selected, the web page may redirect the mobile device 120 to the appropriate application store. This form of setup URI may be printed on sales literature that advertises multiple host device models or advertises the host device without reference to the particular host device model.

The web browser 134 of the mobile device 120 may open the URI. In some embodiments, responsive to scanning the simplified setup URI, the web browser 134 of the mobile device 120 may be initiated. The web browser 134 may send a request to a remote server 125 for the client application 136 indicated by the simplified setup URI. The request to the remote server 125 may include information associated with the mobile device 120. Information associated with the mobile device 120 may include, but is not limited to, device type, version of an operating system executing on the mobile device 120, or default language preferences.

The remote server 125 may detect the type of mobile device and identify the host device (e.g., vehicle 102) based on at least in part the URI. In some embodiments, the remote server 125 may determine the mobile device type by requesting the information from the user. For example, the remote server 125 may display a webpage to prompt the user to select a model type of the mobile device 120. In some embodiments, the remote server 125 may receive the request from the web browser 134 and determine, based at least in part on the information associated with the mobile device 120, the type of mobile device. In some embodiments, the remote server 125 may communicate with the host device and mobile device database 310 to determine the correct client application 136 and associated information.

The remote server 125 may redirect the mobile device 120 to the correct application store to install the correct client application 136 based at least in part on the detection of the type of mobile device 120. The mobile device 120 may then download the correct client application 136 for the host device (e.g., vehicle 102).

The URI generation module 226 of the IVI system 110 of a vehicle 102 may generate a setup URI and present the setup URI to an occupant of the vehicle 102. The setup URI may be presented in the form of a QR code 302, an NFC code 304, a bar code, an audio code, or the like. The setup URI may be presented by the IVI system 110 of the vehicle 102 to one or more occupants of the vehicle 102.

The mobile device 120 may be used to scan the setup URI or otherwise receive the setup URI. Responsive to scanning or otherwise receiving the setup URI, the mobile device 120 may initiate the client application 136. The client application 136 may receive the setup URI and extract or identify information that may be used to establish a connection and pairing between the vehicle 102 and the mobile device 120. The information extracted or identified may include access control information necessary for pairing the mobile device 120 and the host device (e.g., vehicle 102).

The client application 136 on the mobile device 120 may establish a pairing between the vehicle 102 and the client application 136 of the mobile device 120 based at least in part on the setup URI received by the mobile device 120. In some embodiments, the pairing may be between the vehicle 102 and the remote server 125 facilitated by the client application 136.

Figure 5:
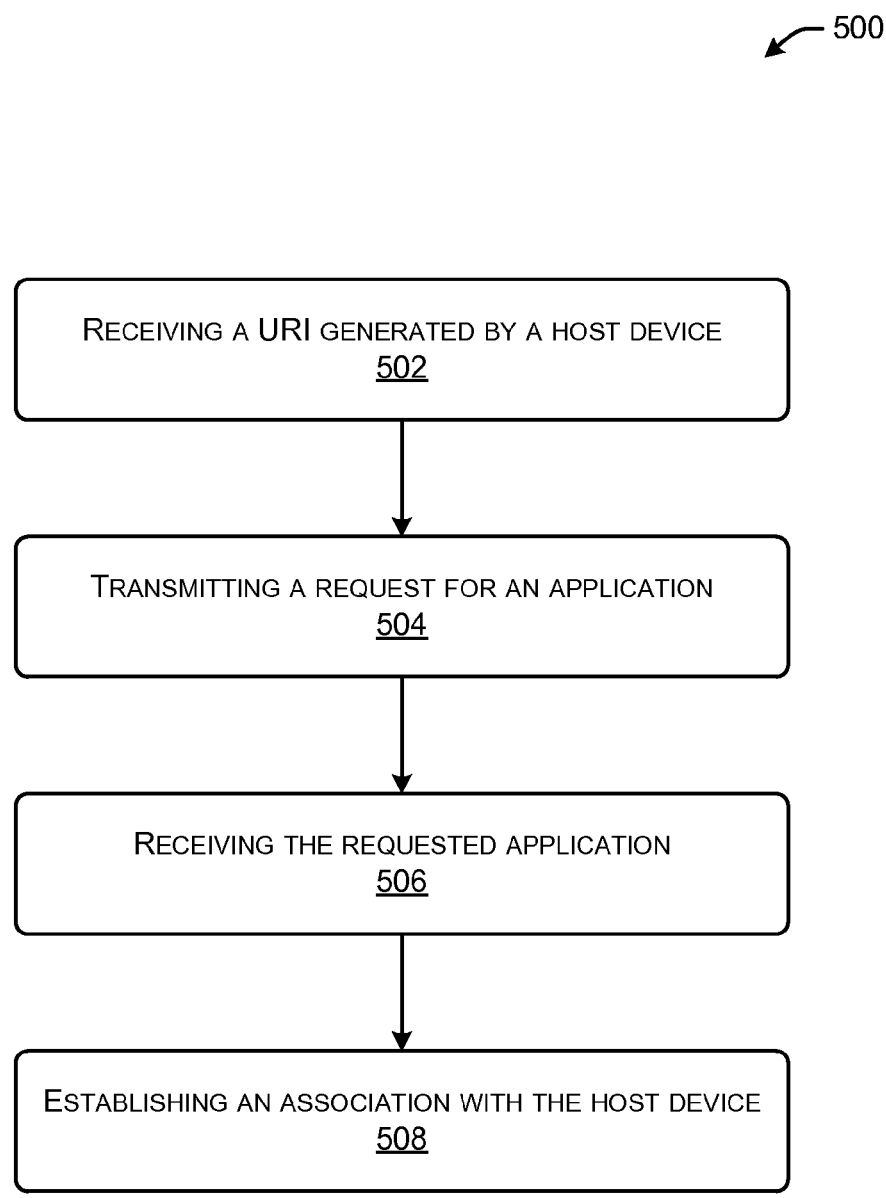
FIG. 5 is a flow diagram of a method for URI-based host to mobile device setup and pairing, in accordance with an embodiment of the disclosure.

FIG. 5 is a flow diagram of a method for URI-based host to mobile device setup and pairing, in accordance with an embodiment of the disclosure. In brief overview, at block 502, a URI generated by a host device may be received. At block 504, the mobile device 120 may transmit a request for a client application 136 based at least in part on the URI. At block 506, the requested client application 136 may be received. At block 508, the mobile device 120 may establish an association with the host device (e.g., vehicle 102).

At block 502, a URI generated by the host device may be received. In some embodiments, the URI generation module 226 may generate a URI. The URI may be generated based at least in part on a cloud service associated with the vehicle 102, a vehicle identification number (VIN), and an authorization code. In some embodiments, the URI may also comprise a count indicating the number of times a URI has been used or accessed and a role indicating the role of the user accessing the URI (e.g., guest or owner of the vehicle 102). The URI may be presented to a mobile device 120 through an IVI system 110 of a vehicle. For example, the URI may be presented as a QR code 302, an NFC code 304, a bar code, an audio code, or the like. In some embodiments, the mobile device 120 may receive the URI by scanning the code presented by the IVI system 110 (e.g., scanning a QR code displayed by the IVI system 110 of a vehicle 102).

At block 504, the mobile device 120 may transmit a request for a client application 136 based at least in part on the URI. In some embodiments, a web browser 134 of the mobile device 120 may receive the URI. The web browser 134 may generate a cookie for the URI. The web browser 134 may open or navigate to the URI over one or more networks 105. The web browser 134 may transmit a request for the client application 136 associated with the vehicle 102 and the mobile device 120 based at least in part on the received URI. The remote server 125 may receive the request and redirect the request for the application based at least in part on data associated with the request. The data associated with the request may include mobile device type, host device type, version of requested client application 136, and the like. The remote server 125 may redirect the mobile device 120 to the appropriate source (e.g., application store).

At block 506, the requested application 136 may be received. The mobile device 120 may download or otherwise obtain the client application 136 from the source the mobile device 120 was redirected to by the remote server 125.

At block 508, the mobile device 120 may establish an association with the host device (e.g., vehicle 102). In some embodiments, the client application 136 may obtain client credentials associated with the user by rescanning the URI generated by the host device. In some embodiments, the client application 136 may obtain client credentials from a helper application executing on the mobile device 120. In some embodiments, the client application 136 may launch the web browser 134 and redirect data stored in the cookie generated by the web browser 134 into the client application 136. The client application 136 may use the client credentials to establish an association between the mobile device 120 and the host device (e.g., vehicle 102).

Certain aspects of the disclosure are described above with reference to block and flow diagrams of systems, methods, apparatus, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, certain embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method comprising:
receiving, by one or more processors of a wireless device, a uniform resource identifier (URI) from a display on a host device;
transmitting, by the one or more processors of the wireless device, a request for an application associated with an in-vehicle infotainment (IVI) system of the host device and the wireless device based at least in part on the URI;
receiving, by the one or more processors of the wireless device, the requested application;
executing, by the one or more processors of the wireless device, the received application;
receiving, by the one or more processors of the wireless device, a second URI from the display on the host device after executing the received application; and
establishing, by the one or more processors of the wireless device, a trusted relationship with the host device based at least in part on the application after receiving the second URI from the display on the host device.

2. The computer-implemented method of claim 1, wherein the URI is received by receiving a quick response (QR) code, a bar code, an audio code, or tapping a near field communication (NFC) equipped wireless device on an NFC interface of the host device or an NFC tag associated with the host device.

3. The computer-implemented method of claim 1, wherein the URI further comprises at least a serial number associated with the host device and an authorization code.

4. The computer-implemented method of claim 3, further comprising generating a cookie storing the URI.

5. The computer-implemented method of claim 4, further comprising:
executing, by the one or more processors of the wireless device, a web browser responsive to obtaining the application;
redirecting, by the one or more processors of the wireless device, the data stored in the cookie into the application; and
authenticating, by the one or more processors of the wireless device, a user associated with the wireless device.

6. The computer-implemented method of claim 1, further comprising:
obtaining, by the one or more processors of the wireless device, information associated with a user of the wireless device; and
authenticating, by the one or more processors of the wireless device, the user based at least in part on the obtained information.

7. The computer-implemented method of claim 6, wherein obtaining the information associated with the user further comprises obtaining the information from a helper application executing on the wireless device.

8. A computer program product residing on a non-transitory computer-readable medium having a plurality of instructions stored thereon which, when executed by a processor associated with a wireless device, cause the processor to perform operations comprising:
receiving a uniform resource identifier (URI) generated by one or more processors of an apparatus and presented on a display on the apparatus;
transmitting a request for an application associated with an in-vehicle infotainment (IVI) system of the apparatus and a wireless device via the URI;
receiving the requested application;
executing the received application;
receiving a second URI from the display on the apparatus after executing the received application; and
establishing a trusted relationship between the wireless device and the apparatus based at least in part on the received application after receiving the second URI from the display on the apparatus.

9. The computer program product of claim 8, wherein receiving the URI further comprises scanning a quick response (QR) code by the wireless device.

10. The computer program product of claim 8, wherein receiving the URI further comprises tapping the wireless device on a near field communication (NFC) interface of the apparatus or an NFC tag associated with the apparatus.

11. The computer program product of claim 8, wherein the URI comprises at least one of an apparatus identification number and an authorization code.

12. The computer program product of claim 8, further comprising:
receiving the request for the application; and
redirecting the request for the application to a location hosting the application based upon, at least in part, data in the request identifying the wireless device as a specific type of wireless device.

13. The computer program product of claim 8, further comprising generating a cookie, wherein the cookie further comprises the URI.

14. The computer program product of claim 13, further comprising:
executing a web browser;
accessing the URI via the cookie; and
authenticating a user associated with the wireless device based upon the data stored in the URI accessed via the cookie.

15. The computer program product of claim 8, further comprising exchanging data between the apparatus and the wireless device over a local wireless link.

16. A system comprising:
one or more computers comprising:
at least one processor; and
at least one memory storing computer-executable instructions,
wherein the at least one processor is operable to access the least one memory and execute the computer-executable instructions to:
receive a quick response (QR) code presented on a display of a host device;

identify a first uniform resource identifier (URI) from the QR code;
transmit a request for an application associated with an in-vehicle infotainment (IVI) system of the host device based at least in part on the identified URI;
receive the application based at least in part on the request;
executing the received application;
receive a second URI generated by the host device via the received application after executing the received application;
identify data from the second URI; and
establish a trusted relationship between a wireless device and the host device using the data identified from the second URI via the application after receiving the second URI generated by the host device via the received application.

17. The system of claim 16, wherein receiving the second URI further comprises scanning a QR code generated by the host device or tapping a near field communication (NFC) equipped wireless device on an NFC interface of the host device, or an NFC tag associated with the host device.

18. The system of claim 16, wherein the first URI further comprises a host device model identifier.

19. The system of claim 16, further comprising providing, by the wireless device, a data connection for the host device, wherein the data connection is configured to facilitate wireless communication between the host device and a cloud service.

20. The system of claim 16, further comprising associating the wireless device with a cloud service.

21. The system of claim 16, further comprising authenticating a user associated with the wireless device.

* * * * *